United States Patent
Brunet et al.

(10) Patent No.: US 10,437,382 B2
(45) Date of Patent: *Oct. 8, 2019

(54) TOUCH SENSOR AND ASSOCIATED CONTROL METHOD FOR DECREASED CAPACITIVE LOADS

(71) Applicant: Atmel Corporation, Chandler, AZ (US)

(72) Inventors: Samuel Brunet, Hampshire (GB);
Richard P. Collins, Hampshire (GB);
Martin J. Simmons, Hampshire (GB);
Justin A. Church, Hampshire (GB)

(73) Assignee: Atmel Corporation, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/025,354

(22) Filed: Jul. 2, 2018

(65) Prior Publication Data

US 2018/0307372 A1 Oct. 25, 2018

Related U.S. Application Data

(63) Continuation of application No. 14/990,974, filed on Jan. 8, 2016, now Pat. No. 10,013,101.

(51) Int. Cl.
  *G06F 3/045* (2006.01)
  *G06F 3/041* (2006.01)
  (Continued)

(52) U.S. Cl.
  CPC ............ *G06F 3/0416* (2013.01); *G06F 3/044* (2013.01); *G06F 3/047* (2013.01);
  (Continued)

(58) Field of Classification Search
  CPC . G06F 2203/04107; G06F 2203/04112; G06F 3/0416; G06F 3/044; G06F 3/047
  See application file for complete search history.

(56) References Cited

U.S. PATENT DOCUMENTS

| 7,663,607 B2 | 2/2010 | Hotelling et al. |
| 7,864,503 B2 | 1/2011 | Chang |

(Continued)

FOREIGN PATENT DOCUMENTS

WO 2012129247 A2 9/2012

OTHER PUBLICATIONS

Myers, S. A. et al., "Electronic Devices With Concave Displays," U.S. Appl. No. 61/454,936, filed Mar. 21, 2011, 23 pages.

(Continued)

*Primary Examiner* — Insa Sadio
(74) *Attorney, Agent, or Firm* — Baker Botts L.L.P.

(57) ABSTRACT

A device includes a controller coupled to a touch sensor. The touch sensor includes a first array of capacitive nodes substantially aligned with a second array of capacitive nodes in a mechanical stack. The controller is configured, when in a self-capacitive mode of operation, to send a first drive signal to a plurality of the electrodes of the first array, send a shield signal to at least a portion of the electrodes of the second array at the same time as the first drive signal is sent to the plurality of electrodes of the first array, and sense touch inputs based on signals received from the plurality of electrodes of the first array while the first drive signal is being sent to the plurality of electrodes of the first array and the shield signal is being sent to the at least a portion of the electrodes of the second array.

20 Claims, 10 Drawing Sheets

(51) Int. Cl.
*G06F 3/044* (2006.01)
*G06F 3/047* (2006.01)

(52) U.S. Cl.
CPC .............. *G06F 2203/04107* (2013.01); *G06F 2203/04111* (2013.01); *G06F 2203/04112* (2013.01)

(56) References Cited

U.S. PATENT DOCUMENTS

| | | | |
|---|---|---|---|
| 7,875,814 | B2 | 1/2011 | Chen et al. |
| 7,920,129 | B2 | 4/2011 | Hotelling et al. |
| 8,031,094 | B2 | 10/2011 | Hotelling et al. |
| 8,031,174 | B2 | 10/2011 | Hamblin et al. |
| 8,040,326 | B2 | 10/2011 | Hotelling et al. |
| 8,049,732 | B2 | 11/2011 | Hotelling et al. |
| 8,179,381 | B2 | 5/2012 | Frey et al. |
| 8,217,902 | B2 | 7/2012 | Chang et al. |
| 8,723,824 | B2 | 5/2014 | Myers et al. |
| 2008/0309635 | A1 | 12/2008 | Matsuo |
| 2009/0315854 | A1 | 12/2009 | Matsuo |
| 2011/0153243 | A1* | 6/2011 | Modafe .................. G06F 3/044 702/64 |
| 2012/0242588 | A1 | 9/2012 | Myers et al. |
| 2012/0242592 | A1 | 9/2012 | Rothkopf et al. |
| 2012/0243151 | A1 | 9/2012 | Lynch |
| 2012/0243719 | A1 | 9/2012 | Franklin et al. |
| 2013/0076612 | A1 | 3/2013 | Myers |
| 2015/0324062 | A1* | 11/2015 | Elias ...................... G06F 3/044 345/174 |

OTHER PUBLICATIONS

Lynch, S. B., "Electronic Devices With Convex Displays," U.S. Appl. No. 61/454,950, filed Mar. 21, 2011, 28 pages.
Rothkopf, F. R. et al., "Electronic Devices With Flexible Displays," U.S. Appl. No. 61/454,894, filed Mar. 21, 2011, 41 pages.
Brunet, S. et al., Restriction Requirement, U.S. Appl. No. 14/990,974, dated Mar. 23, 2017, 6 pages.
Brunet, S. et al., Election, U.S. Appl. No. 14/990,974, dated May 23, 2017, 1 page.
Brunet, S. et al., Non-Final Rejection, U.S. Appl. No. 14/990,974, dated Aug. 24, 2017, 14 pages.
Brunet, S. et al., Amendment after Non-Final Rejection, U.S. Appl. No. 14/990,974, dated Nov. 20, 2017, 11 pages.
Brunet, S. et al., Notice of Allowance, U.S. Appl. No. 14/990,974, dated Mar. 8, 2018, 5 pages.

* cited by examiner

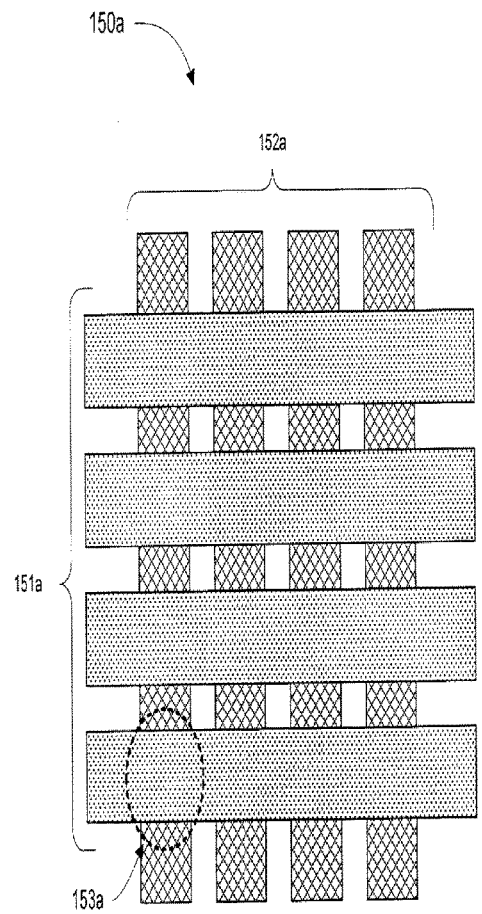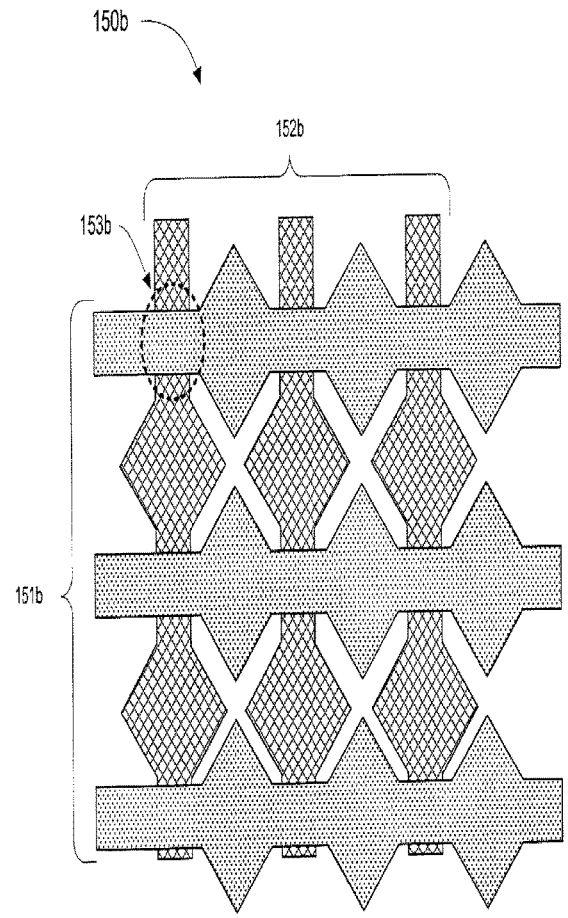
*FIG. 1B*  *FIG. 1C*

TOUCH SENSOR AND ASSOCIATED CONTROL METHOD FOR DECREASED CAPACITIVE LOADS

RELATED APPLICATION

This application is a continuation under 35 U.S.C. § 120 of U.S. application Ser. No. 14/990,974, filed Jan. 8, 2016 and entitled Touch Sensor and Associated Control Method for Decreased Capacitive Loads, incorporated herein by reference.

TECHNICAL FIELD

This disclosure generally relates to touch sensors.

BACKGROUND

A touch sensor may detect the presence and position of a touch or the proximity of an object (such as a user's finger or a stylus) within a touch-sensitive area of touch sensor overlaid on a display screen, for example. In a touch-sensitive-display application, touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

BRIEF DESCRIPTION OF THE DRAWINGS

FIGS. 1A-1D illustrate an example touch sensor system according to certain embodiments of the present disclosure.

DESCRIPTION OF EXAMPLE EMBODIMENTS

The integration of displays and touch sensors (i.e., where the touch sensor and display are in the same mechanical stack and/or electrically coupled to one another; that is, they may share electrical connections, components, or voltage supplies) can cause significantly increased load seen by a controller of the touch sensor, especially in self-capacitive modes of operation. For instance, current touch sensor designs with integrated displays may have loads between approximately 250 and 1000 pF per sense line or electrode during mutual-capacitive modes of operation where only a few (e.g., 1 or 2) lines are driven together at the same time. During self capacitive modes of operation, all sensor lines are driven together resulting in much higher capacitive loads. These increased loads seen by the touch sensor controller can impact a number of aspects related to the performance of the touch sensor or display. For example, display operation, ability to drive the touch sensor electrodes, touch sensing response time (i.e., the frequency of touch sense determination), controller power consumption, and overall noise handling may all be affected by touch sensors with high loads.

Accordingly, the present disclosure describes a touch sensor and associated control method for decreased capacitive loads. For instance, electrodes of a touch sensor according to embodiments of the present disclosure may have a load of under 100 pF during self-capacitive modes of operation. In particular, the present disclosure describes a two-layer touch sensor architecture and an associated touch sensing control method that results in decreased loads seen by a controller, especially during self-capacitive modes of operation using driven shield signals on one or more electrodes of the touch sensor.

In one embodiment, for example, a device includes controller coupled to a touch sensor. The touch sensor includes a first array of capacitive nodes disposed above a second array of capacitive nodes in a mechanical stack forming a plurality of crossover regions. When in the mutual-capacitive mode of operation, the controller is configured to send a first drive signal to one or more first electrodes of the first array (e.g., the x-axis electrodes), send the first drive signal to one or more first electrodes of the second array (e.g., the x-axis electrodes), and sense touch inputs based on signals received from y-axis electrodes of the first array. When in the self-capacitive mode of operation, the controller is configured to send a second drive signal to a first plurality of the electrodes of the first array, send a shield signal to each of the electrodes of the second array, and sense touch inputs based on signals received from the first plurality of electrodes of the first array.

Figure 1A:
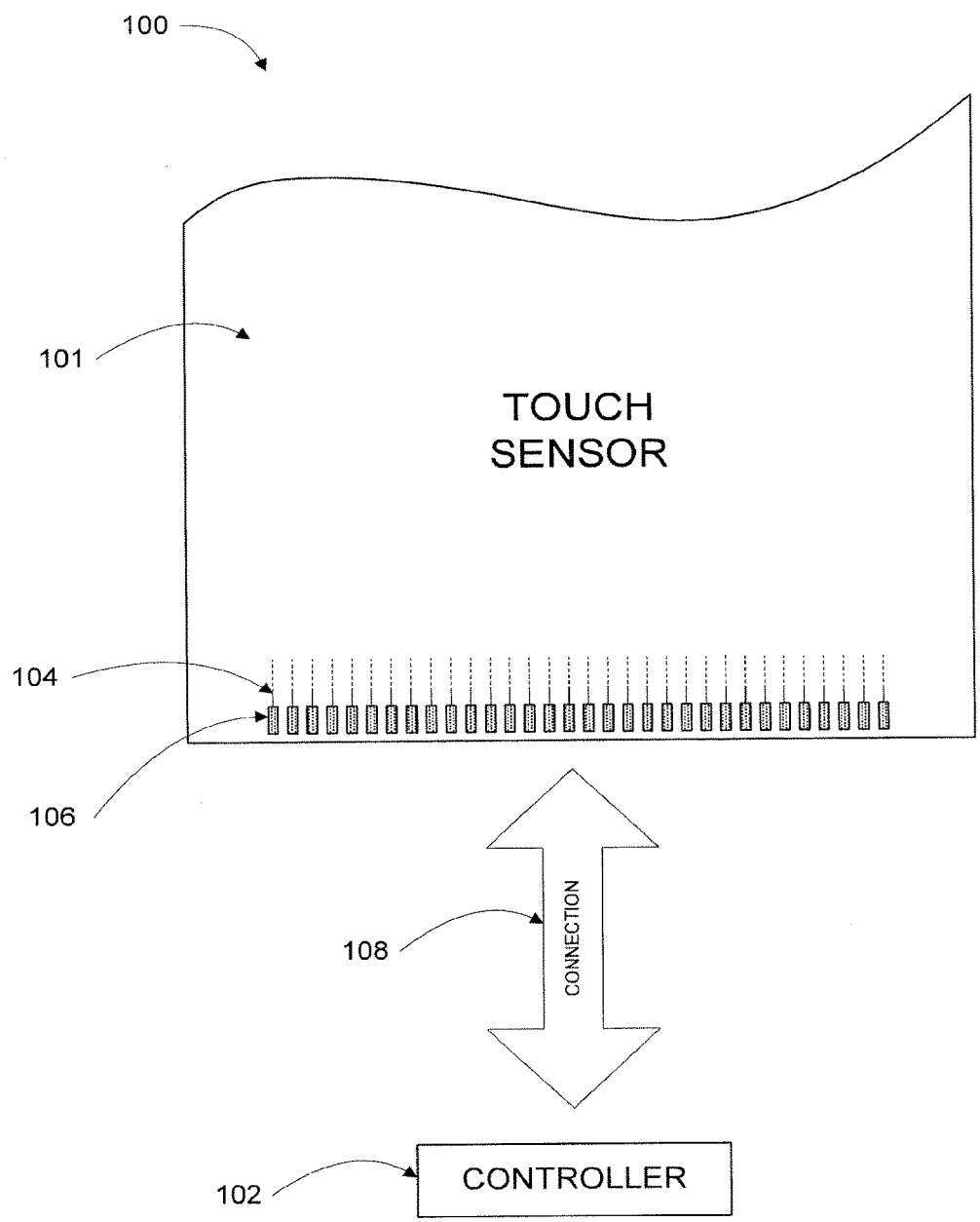

To facilitate a better understanding of the present disclosure, the following examples of certain embodiments are given. In no way should the following examples be read to limit, or define, the scope of the disclosure. Embodiments of the present disclosure and its advantages may be best understood by referring to FIGS. 1-5, where like numbers are used to indicate like and corresponding parts FIGS. 1A-1D illustrate an example touch sensor system 100 according to certain embodiments of the present disclosure. Referring to FIG. 1A, touch sensor system 100 comprises a touch sensor 101 and touch sensor controller 102 that are operable to detect the presence and position of a touch or the proximity of an object within a touch-sensitive area of touch sensor 101. Touch sensor 101 may include a two-layer touch sensor architecture in accordance with particular embodiments of the present disclosure. For instance, touch sensor 101 may include a top layer and a bottom layer, wherein each of the top layer and the bottom layer comprises an array of capacitive nodes formed by electrodes. The array of the top layer may be disposed above the array of the bottom layer, such that the capacitive nodes of each layer substantially align to form crossover regions as discussed below. Touch sensor 101 includes one or more touch-sensitive areas.

The electrodes of touch sensor 101 include a conductive material forming a shape, such as a disc, square, rectangle, thin line, diamond, other shape, or a combination of these shapes. One or more cuts in one or more layers of conductive material may (at least in part) create the shape of an electrode, and the area of the shape may (at least in part) be bounded by those cuts. In certain embodiments, the conductive material of an electrode occupies approximately 100% of the area of its shape. For example, an electrode may be made of indium tin oxide (ITO) and the ITO of the electrode may occupy approximately 100% of the area of its shape (sometimes referred to as 100% fill). In certain embodiments, the conductive material of an electrode occupies less than 100% of the area of its shape. For example, an electrode may be made of fine lines of metal or other conductive material (FLM), such as for example copper, silver, carbon, or a copper-, silver-, or carbon-based material, and the fine lines of conductive material may occupy only a few percent (e.g., approximately 5%) of the area of its shape in a hatched, mesh, or other pattern. Although this disclosure describes or illustrates particular electrodes made of particular conductive material forming particular shapes with particular fill percentages having particular patterns, this disclosure contemplates electrodes made of any appropriate conductive material forming any appropriate shapes with any appropriate fill percentages having any suitable patterns.

FIGS. 1B-1C illustrate example configurations 150 of electrodes in a touch sensor array in accordance with certain embodiments of the present disclosure. In particular, configuration 150a of FIG. 1A comprises electrodes in a grid pattern, while configuration 150b of FIG. 1B comprises electrodes in a diamond pattern. Each of configurations 150 comprises a first set of electrodes 151 and a second set of electrodes 152, wherein the first set of electrodes 151 and the second set of electrodes 152 overlap to form a plurality of capacitive nodes 153. Although described in particular patterns, the electrodes of touch sensors according to the present disclosure may be in any appropriate pattern. In certain embodiments, for example, first set of electrodes 151 may not be horizontal as illustrated and the second set of electrodes 152 may not be vertical as illustrated. Rather, the first set of electrodes 151 may be any appropriate angle to horizontal and the second set of electrodes 152 may be any appropriate angle to vertical. This disclosure is not limited to the configurations 150 of electrodes 151 and electrodes 152 illustrated in FIGS. 1B-1C. Instead, this disclosure anticipates any appropriate pattern, configuration, design, or arrangement of electrodes and is not limited to the example patterns discussed above.

Figure 1D:
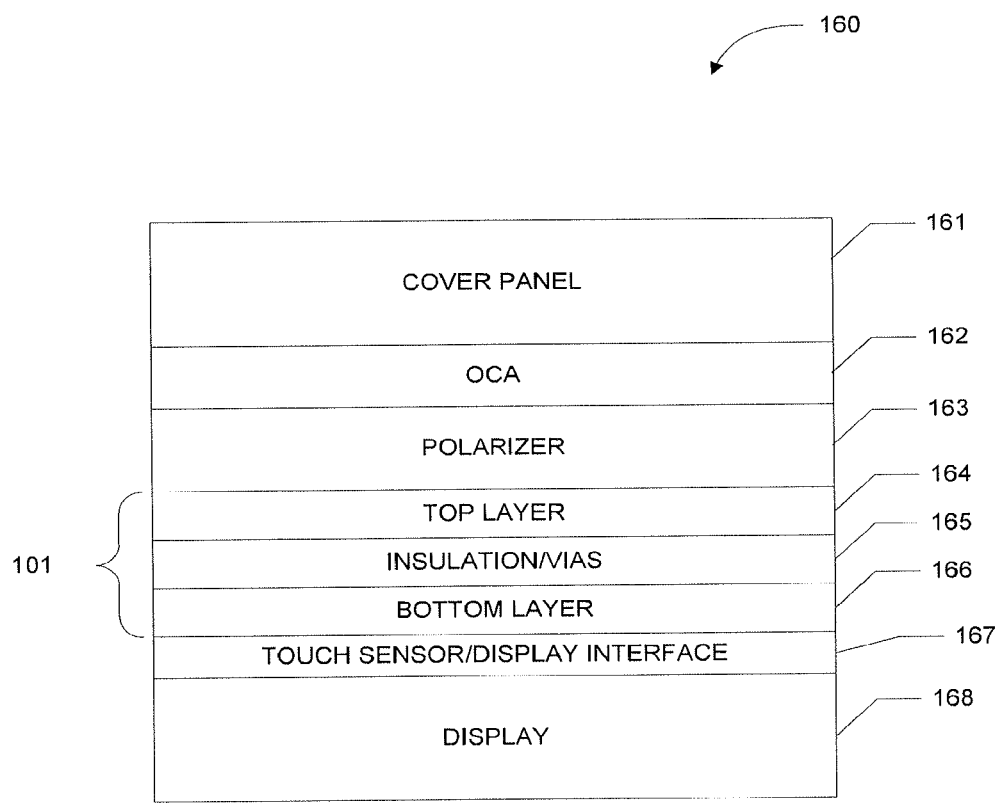

FIG. 1D illustrates an example mechanical stack 160 that houses touch sensor 101 in accordance with embodiments of the present disclosure. Mechanical stack 160 includes a layer of optically clear adhesive (OCA) 162 beneath a cover panel 161. Cover panel 161 may be clear and made of a resilient material suitable for repeated touching, such as for example glass, polycarbonate, polyethylene terephthalate (PET), or polymethyl methacrylate (PMMA). The layer of OCA 162 may be disposed between cover panel 161 and polarizer 163, which may be operable to polarize light as it passes therethrough.

Mechanical stack 160 also includes touch sensor 101. According to particular embodiments of the present disclosure, touch sensor 101 comprises two layers: top layer 164 and bottom layer 166. Top layer 164 and bottom layer 166 each comprise an array of capacitive nodes formed by overlapping electrodes, and each layer may be laid out in configurations similar to configurations 150 of FIGS. 1B-1C or in other suitable configurations. The electrodes and/or capacitive nodes of top layer 164 may be substantially aligned with the electrodes and/or capacitive nodes of bottom layer 166 such that crossover regions are formed as described below (e.g., crossover region 305 of FIGS. 3A-3B). That is, electrodes of top layer 164 running in a first direction (e.g., x-axis electrodes of layer 164) may be aligned with electrodes of bottom layer 166 running in the same direction (e.g., x-axis electrodes of layer 166). Similarly, electrodes of top layer 164 running in a second direction (e.g., y-axis electrodes of layer 164) may be aligned with electrodes of bottom layer 166 running in the same direction (e.g., y-axis electrodes of layer 166). As such, the capacitive nodes formed by the overlapping electrodes of each layer may also align with one another. Electrodes aligned with one another in accordance with the present disclosure may be referred to herein as corresponding with one another. Top layer 164 and bottom layer 166 are separated in mechanical stack 160 by insulation layer 165, which may be composed of a dielectric material in some embodiments. As will be described further below, insulation layer 165 may further comprise one or more vias that couple one or more electrodes of top layer 164 with one or more electrodes of bottom layer 166.

Mechanical stack 160 further includes an interface layer 167 and a display 168. Interface layer 167 includes suitable components for electronically and/or otherwise communicatively coupling touch sensor 101 with display 168. In some embodiments, the display 168 may be integrated with touch sensor 101 such that one or more electronic components or connections are shared between touch sensor 101 and display 168. Although this disclosure describes a particular mechanical stack with a particular number of particular layers made of particular materials, this disclosure contemplates any suitable mechanical stack comprising a two-layer touch sensor and having any suitable number of any suitable layers made of any suitable materials.

In certain embodiments, touch sensor 101 implements a capacitive form of touch sensing that includes both mutual- and self-capacitive modes of operation. In a mutual-capacitive mode of operation, touch sensor 101 includes an array of electrodes forming an array of capacitive nodes, which includes drive and sense electrodes. A drive electrode and a sense electrode may form a capacitive node (e.g., the first set of electrodes 151 and the second set of electrodes 152 of FIGS. 1B-1C, respectively, forming capacitive nodes 153). The drive and sense electrodes forming the capacitive node are positioned near each other, but do not make electrical contact with each other. Instead, in response to a signal being applied to the drive electrodes for example, the drive and sense electrodes capacitively couple to each other across a space where the electrodes overlap each other. A pulsed or alternating voltage applied to the drive electrode (e.g., by touch sensor controller 102) induces a charge on the sense electrode, and the amount of charge induced is susceptible to external influence (such as a touch or the proximity of an object). When an object touches or comes within proximity of the capacitive node, a change in capacitance may occur at the capacitive node and touch sensor controller 102 measures the change in capacitance. By measuring changes in capacitance throughout the array, touch sensor controller 102 determines the position of the touch or proximity within touch-sensitive areas of touch sensor 101.

In a self-capacitive mode of operation, (in contrast to mutual-capacitive modes of operation), both sets of electrodes (e.g., both the first set of electrodes 151 and the second set of electrodes 152) are driven to create what may be referred to as a "self-capacitance" in the capacitive nodes formed thereby. The self-capacitance of a capacitive node may refer to the amount of charge needed to raise the voltage in the capacitive node by a pre-determined amount. When an object touches or comes within proximity of the capacitive node in self-capacitive modes of operation, a change in self-capacitance may occur at the capacitive node and touch sensor controller 102 measures the change in self-capacitance (for example, as a change in the amount of charge required to raise the voltage at the capacitive node by a pre-determined amount). By measuring changes in self-capacitance throughout the array, touch sensor controller 102 determines the position of the touch or proximity within touch-sensitive areas of touch sensor 101.

In certain embodiments, one or more drive electrodes together may form a drive line running horizontally or vertically or in any suitable orientation. Similarly, in certain embodiments, one or more sense electrodes together may form a sense line running horizontally or vertically or in any suitable orientation. In one particular example, drive lines run substantially perpendicular to the sense lines. However, the drive lines and sense lines of touch sensors according to the present disclosure may run in any particular orientation with respect to one another. Reference to a drive line may encompass one or more drive electrodes making up the drive line, and vice versa. Reference to a sense line may encompass one or more sense electrodes making up the sense line, and vice versa.

As described above, a change in capacitance at a capacitive node of touch sensor 101 may indicate a touch or proximity input at the position of the capacitive node. Touch sensor controller 102 detects and processes the change in capacitance to determine the presence and position of the touch or proximity input. In certain embodiments, touch sensor controller 102 then communicates information about the touch or proximity input to one or more other components (such as one or more central processing units (CPUs)) of a device that includes touch sensor 101 and touch sensor controller 102, which may respond to the touch or proximity input by initiating a function of the device (or an application running on the device). Although this disclosure describes a particular touch sensor controller having particular functionality with respect to a particular device and a particular touch sensor, this disclosure contemplates any suitable touch sensor controller having any suitable functionality with respect to any suitable device and any suitable touch sensor.

In certain embodiments, touch sensor controller 102 is implemented as one or more integrated circuits (ICs), such as for example general-purpose microprocessors, microcontrollers, programmable logic devices or arrays, application-specific ICs (ASICs). Touch sensor controller 102 comprises any suitable combination of analog circuitry, digital logic, and digital non-volatile memory. In particular embodiments, touch sensor controller 102 may comprise instructions stored in a computer-readable medium (e.g., memory), wherein the instructions are configured, when executed by a processor unit of touch sensor controller 102, to perform one or more functions or steps of a method. In certain embodiments, touch sensor controller 102 is disposed on a flexible printed circuit (FPC) bonded to the substrate of touch sensor 101, as described below. The FPC may be active or passive. In certain embodiments, multiple touch sensor controllers 102 are disposed on the FPC.

In an example implementation, touch sensor controller 102 includes a processor unit, a drive unit, a sense unit, and a storage unit. In such an implementation, the drive unit supplies drive signals to the drive electrodes of touch sensor 101, and the sense unit senses charge at the capacitive nodes of touch sensor 101 and provides measurement signals to the processor unit representing capacitances at the capacitive nodes. The processor unit controls the supply of drive signals to the drive electrodes by the drive unit and process measurement signals from the sense unit to detect and process the presence and position of a touch or proximity input within touch-sensitive areas of touch sensor 101. The processor unit may also track changes in the position of a touch or proximity input within touch-sensitive areas of touch sensor 101. The storage unit stores programming for execution by the processor unit, including programming for controlling the drive unit to supply drive signals to the drive electrodes, programming for processing measurement signals from the sense unit, and other suitable programming. Although this disclosure describes a particular touch sensor controller having a particular implementation with particular components, this disclosure contemplates any suitable touch sensor controller having any suitable implementation with any suitable components.

Tracks 104 of conductive material disposed on the substrate of touch sensor 101 couple the drive or sense electrodes of touch sensor 101 to connection pads 106, also disposed on the substrate of touch sensor 101. As described below, connection pads 106 facilitate coupling of tracks 104 to touch sensor controller 102. Tracks 104 may extend into or around (e.g., at the edges of) touch-sensitive areas of touch sensor 101. In certain embodiments, particular tracks 104 provide drive connections for coupling touch sensor controller 102 to drive electrodes of touch sensor 101, through which the drive unit of touch sensor controller 102 supplies drive signals to the drive electrodes, and other tracks 104 provide sense connections for coupling touch sensor controller 102 to sense electrodes of touch sensor 101, through which the sense unit of touch sensor controller 102 senses charge at the capacitive nodes of touch sensor 101.

Tracks 104 are made of fine lines of metal or other conductive material. For example, the conductive material of tracks 104 may be copper or copper-based. As another example, the conductive material of tracks 104 may be silver or silver-based. In certain embodiments, tracks 104 are made of ITO in whole or in part in addition or as an alternative to the fine lines of metal or other conductive material. Although this disclosure describes particular tracks made of particular materials with particular widths, this disclosure contemplates any suitable tracks made of any suitable materials with any suitable widths. In addition to tracks 104, touch sensor 101 may include one or more ground lines terminating at a ground connector (which may be a connection pad 106) at an edge of the substrate of touch sensor 101 (similar to tracks 104).

Connection pads 106 may be located along one or more edges of the substrate, outside touch-sensitive areas of touch sensor 101. As described above, touch sensor controller 102 may be on an FPC. Connection pads 106 may be made of the same material as tracks 104 and may be bonded to the FPC using an anisotropic conductive film (ACF). In certain embodiments, connection 108 include conductive lines on the FPC coupling touch sensor controller 102 to connection pads 106, in turn coupling touch sensor controller 102 to tracks 104 and to the drive or sense electrodes of touch sensor 101. In another embodiment, connection pads 106 are connected to an electro-mechanical connector (such as a zero insertion force wire-to-board connector); in this embodiment, connection 108 may not include an FPC, if desired. This disclosure contemplates any suitable connection 108 between touch sensor controller 102 and touch sensor 101.

Figure 2:
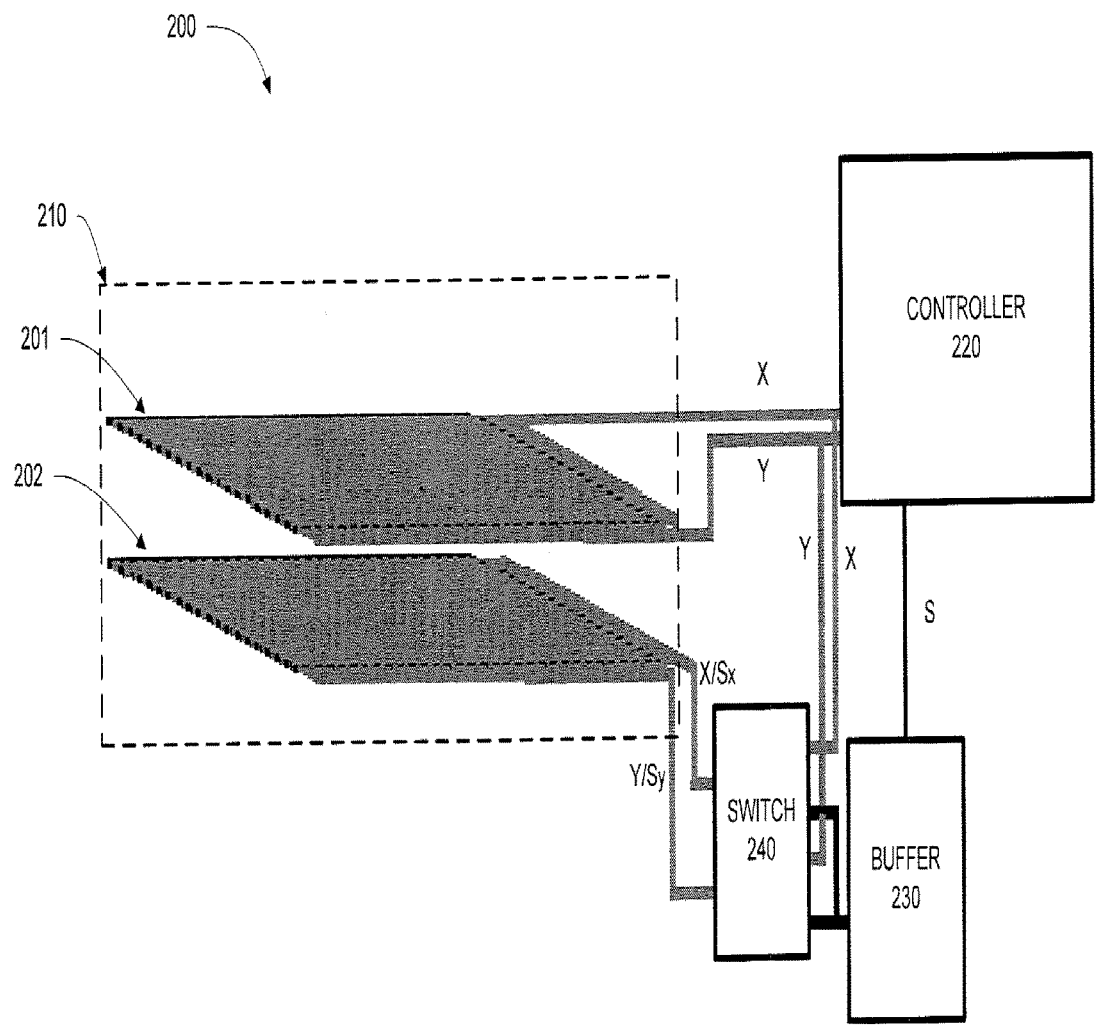
FIG. 2 illustrates an example two-layer capacitive touch sensor system according to certain embodiments of the present disclosure.

FIG. 2 illustrates an example two-layer capacitive touch sensor system 200 according to certain embodiments of the present disclosure. In particular embodiments, touch sensor system 200 may be incorporated in a touch-sensitive display application wherein touch sensor system 200 is overlaid on a display or electrically integrated with the display. For instance, touch sensor system 200 may be attached to or provided as part of a desktop computer, laptop computer, tablet computer, personal digital assistant (PDA), smartphone, satellite navigation device, portable media player, portable game console, kiosk computer, point-of-sale device, or other suitable device that senses touch inputs at its display. Further, in particular embodiments, touch sensor system 200 may be incorporated in an integrated display and touch sensor application, where the display and touch sensor are electrically and mechanically coupled to one another in a stack (e.g., mechanical stack 160 of FIG. 1D), and share one or more electrical connections and/or components.

Touch sensor system 200 comprises touch sensor 210, which includes touch sensor layers 201-202. Touch sensor system 200 further comprises controller 220 coupled to each of layers 201-202. Each of layers 201-202 includes an array of capacitive nodes formed by electrodes, which may be comprised of any suitable conductive material. For example, in certain embodiments, the electrodes of touch sensor layers 201-202 may be composed of conductive mesh materials, such as metal meshes. As another example, in certain embodiments, the electrodes of touch sensor layers 201-202 may be composed of ITO. An example capacitive node of layers 201-202 is described further below with respect to FIGS. 3A-3B and FIGS. 4A-4D.

Figures 3A, 3B:
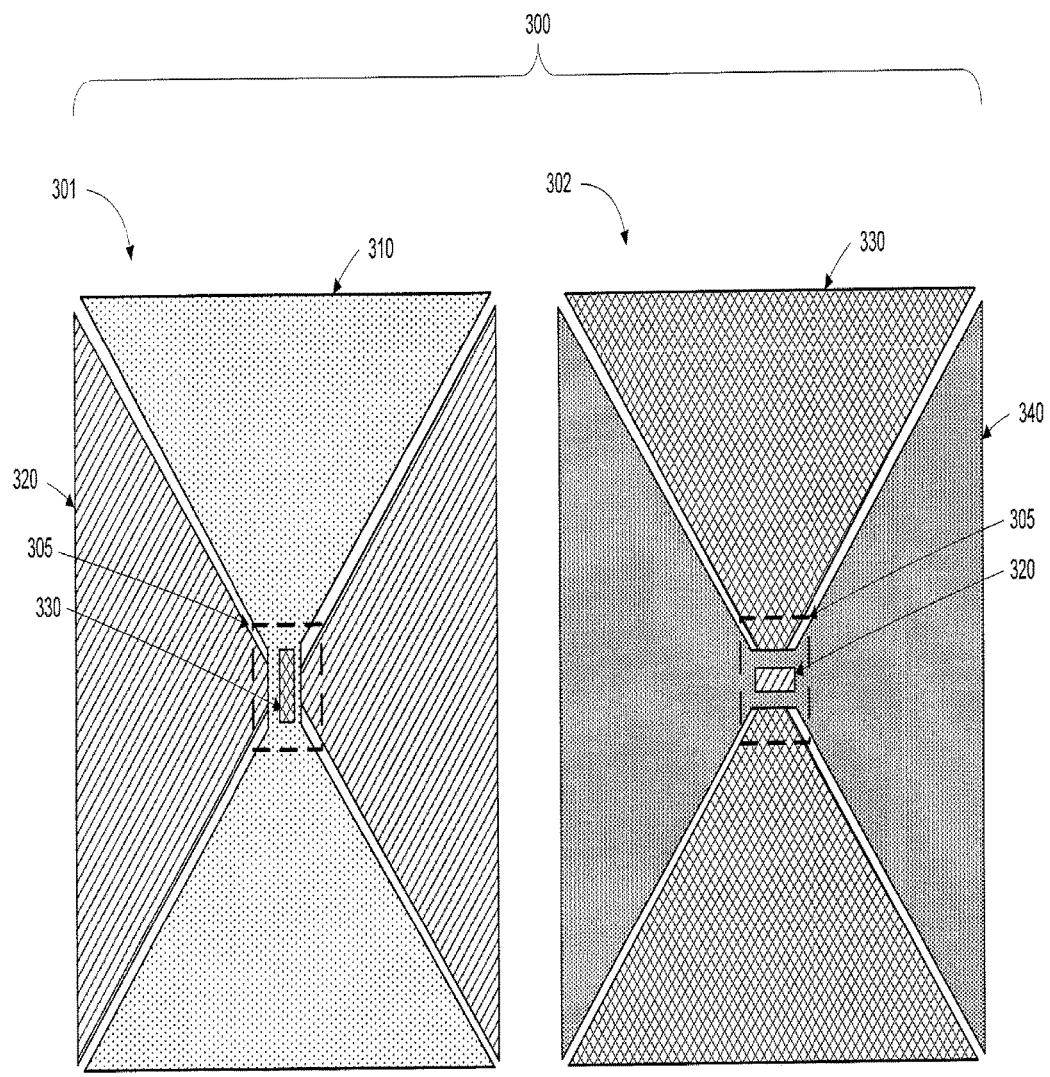
FIGS. 3A-3B illustrate an example capacitive node of a two-layer touch sensor according to certain embodiments of the present disclosure.

The capacitive nodes of layers 201 and 202 are formed by x-axis and y-axis electrodes, and may be similar to configurations 150 of FIGS. 1B-1C in certain embodiments or may be similar to conductive mesh layers 301-302 of FIGS. 3A-3B. The x-axis electrodes and y-axis electrodes of touch sensor layer 201 are directly coupled to controller 220, while the x-axis electrodes and y-axis electrodes of touch sensor layer 202 are coupled to controller 210 through buffer 230 and switch 240. Buffer 230 includes circuitry for buffering signals sent by controller 220, such as a non-inverting amplifier that attenuates or amplifies the signals sent by controller 220. Although illustrated as separate components, one or more components of buffer 230 may be incorporated into controller 220 in some embodiments. Switch 240 includes circuitry for switching between (for sending to the electrodes of layer 202) the same signals as sent to the electrodes of layer 201 from controller 220, and driven shield signals from controller 220, as described further below.

In operation, touch sensor system 200 may be operated in a mutual- or self-capacitive sensing mode. During mutual-capacitive modes of operation, as described above, a drive signal may be sent on one or more x-axis electrodes with changes in capacitance caused by touch inputs being detected on one or more y-axis sensing electrodes capacitively coupled to the driven x-axis electrodes. More than one x-axis electrode may be driven simultaneously. For example, a, and particular embodiment may drive one, two, four, eight, sixteen, or any other number of x-axis electrodes simultaneously. In system 200, during mutual-capacitive modes of touch sensing, the signals sent to or the electrodes of layer 201 by controller 220 may be the same as those sent to the electrodes of layer 202. That is, in certain embodiments, the drive signals sent to x-axis electrodes of layer 201 are the same as the drive signals sent to x-axis of layer 202. Sensing may be performed by detecting signals from sensing electrodes of one or both of layers 201-202 by controller 220 according to mutual-capacitive sensing techniques. For instance, in certain embodiments, sensing may be performed by detecting signals on y-axis electrodes of layer 201, layer 202, or a combination of both.

For example, the location of a touch input on touch sensor 210 may be determined by applying (using controller 220) a pulsed or alternating voltage (i.e., a drive signal) to the x-axis electrodes (i.e., drive electrodes) of both layers 201-202, which induces a charge on y-axis electrodes (i.e., sense electrodes) of layers 201-202 via overlap regions between the x-axis and y-axis electrodes. The induced charge (i.e., sensed signal) on the y-axis electrodes of layer 201, 202, or both is then measured by controller 220 to determine the location of the touch input on touch sensor 210. Because the x-axis electrodes of both layer 201 and layer 202 may be driven using the same signal during mutual-capacitive modes of operation (i.e., the "X" drive signals illustrated are sent to both layers 201-202), switch 240 may be controlled by controller 220 to pass the same "X" drive signals to the x-axis electrodes of layer 202 as are sent to the x-axis electrodes of layer 201 (versus sending a driven shield signal "S" to the electrodes of layer 202). The "Y" signals in FIG. 2 may refer to the sensed signals.

During self-capacitive modes of operation on the other hand, a pulsed or alternating voltage is applied (using controller 220) to both x-axis electrodes and y-axis electrodes of layer 201 while the x-axis and y-axis electrodes of layer 202 are driven with a driven shield signal. The location of a touch input on touch sensor 210 may thus be determined by measuring the changes in capacitance in the capacitive nodes of layer 201. The driven shield signal may be a substantially similar or identical waveform to the drive signal applied to the x-axis and y-axis electrodes of layer 201. In particular, the driven shield signal may be a waveform signal wherein the high reference and low reference voltages (e.g., the high and low voltages of a pulsed or alternating signal) applied to each of the measured and non-measured electrodes are substantially similar, reducing the changes in mutual capacitance present between measured and non-measured electrodes of layer 201.

In certain embodiments, not all x-axis electrodes and y-axis electrodes of layer 201 may be driven at the same time during self-capacitive modes of operation (e.g., due to limited controller resources or to conserve controller resources). Accordingly, during such modes, a scan of the electrodes may be performed. This may occur in three cycles (i.e., only one third of the sensor lines are being measured at a time), for example, where y-axis electrodes are measured first, odd x-axis electrodes are measured second, and even x-axis electrodes are measured third. In scanning embodiments, if non-measured electrodes are left floating (i.e., with no applied drive signal or voltage), interactions may take place between measured and non-measured electrodes due to the mutual capacitance present between the respective electrodes. Accordingly, the driven shield signals may cancel one or more effects caused by the mutual capacitance present between measured and non-measured electrodes of touch sensor 210 during self-capacitive modes of operation.

During such self-capacitive modes of operation where limited numbers of sensor lines are measured at a time, portions of the x-axis electrodes and/or y-axis electrodes of layer 201 may be driven with a drive signal (e.g., a pulsed or alternating voltage), with other portions of the x-axis electrodes and/or y-axis electrodes of layer 201 being driven with a driven shield signal. For example, in one embodiment, even x-axis electrodes of layer 201 are driven for touch sensing but not the odd x-axis electrodes of layer 201. During this time, the odd x-axis electrodes of layer 201 are driven with a driven shield signal rather than left to float without an applied voltage. The driven shield signal may be a signal that is the same or substantially similar to the drive signal applied to the even x-axis electrodes of layer 201, such that the high reference and low reference voltages applied to each of the even and odd x-axis electrodes of layer 201 are substantially similar, which reduces the changes in mutual capacitance present between measured and non-measured electrodes of layer 201. The x-axis and y-axis electrodes of layer 202 may also be driven with a driven shield signal as well. In certain embodiments, the signal applied to the x-axis and y-axis electrodes of layer 202 is the same driven shield signal that is applied to the odd x-axis electrodes of layer 201. Accordingly, switch 240 may be controlled by controller 220 to pass the "$S_x$" and "$S_y$" driven shield signals to the electrodes of layer 202.

Modifications, additions, or omissions may be made to touch sensor system 200 without departing from the scope of the invention. For example, although particular electrodes are referred to above as sending drive signals to x-axis electrodes and sensing y-axis electrodes in mutual-capacitive modes of operation, it will be understood that the drive signals may be sent to y-axis electrodes with sensing performed using x-axis electrodes. As another example, although described with regard to three cycles, touch sensor scanning may be performed in any suitable number of cycles.

FIGS. 3A-3B illustrate an example capacitive node 300 of a two-layer touch sensor according to certain embodiments of the present disclosure. As described above, layers 301-302 may each comprise an array of capacitive nodes formed by electrodes, and may be used in a touch sensor similar to touch sensor 210 of FIG. 2, with layers 301-302 corresponding to layers 201-202 of FIG. 2, respectively. Capacitive node 300 represents a single sensing area or coordinate of a touch sensor in this example. FIGS. 3A-3B illustrate bird's eye views of layers 301-302 in capacitive node 300. Capacitive node 300 of FIGS. 3A-3B is formed by layers 301-302, which are each a mesh of conductive material in this example. In other embodiments, capacitive node 300 may be formed by two layers of any suitable array of capacitive nodes, such as two layers of capacitive nodes formed by overlapping ITO electrodes or two layers of capacitive nodes formed by differing types of conductive materials (e.g., layer 301 formed of conductive mesh and layer 302 formed of overlapping ITO electrodes). Although illustrated in a side-by-side configuration, it will be understood that layer 301 is disposed above layer 302 in a mechanical stack, such that the crossover region 305 of each layer is substantially aligned. In this embodiment, layer 301 represents a top layer of a two-layer touch sensor, similar to layer 201 of touch sensor system 200 of FIG. 2. Likewise, layer 302 represents a bottom layer of a two-layer touch sensor, similar to layer 202 of touch sensor system 200 of FIG. 2.

Layer 301 comprises a first portion 310, a second portion 320, and a third portion 330. Each of first portion 310, second portion 320, and third portion 330 are electrically uncoupled from one another. This may be done by forming the mesh without such coupling connections, or by de-coupling existing connections in the mesh. First portion 310 and second portion 320 may overlap with one another (via second portion 320 being coupled to a portion of layer 302 as described below) to form crossover region 305. Third portion 330 is within the crossover region 305 of first portion 310 and second portion 320, but is electrically coupled to a portion of layer 302 as described below. Similar to layer 301, layer 302 comprises a first portion 330, a second portion 340, and a third portion 320. First portion 330 of layer 302 corresponds with first portion 310 of layer 301, and vice versa. Likewise, second portion 340 of layer 302 corresponds with second portion 320 of layer 301, and vice versa. Each of first portion 330, second portion 340, and third portion 320 are electrically uncoupled from one another. This may be done by forming the mesh without such coupling connections, or by de-coupling existing connections in the mesh. First portion 330 and second portion 340 may overlap with one another (via first portion 330 being coupled to a portion of layer 301 as described below) to form crossover region 305. Third portion 320 is within the crossover region 305 of first portion 330 and second portion 340, but is electrically coupled to a portion of layer 301 as described below.

Modifications, additions, or omissions may be made to capacitive node 300 without departing from the scope of the invention. For example, although illustrated in FIGS. 3A-3B and described above as being layers of conductive mesh comprising arrays of capacitive nodes, layers 301-302 may be include any suitable array of capacitive nodes. For example, each of layers 301-302 may comprise arrays of capacitive nodes formed by overlapping ITO electrodes or other suitable types of conductive materials.

Figure 4A:
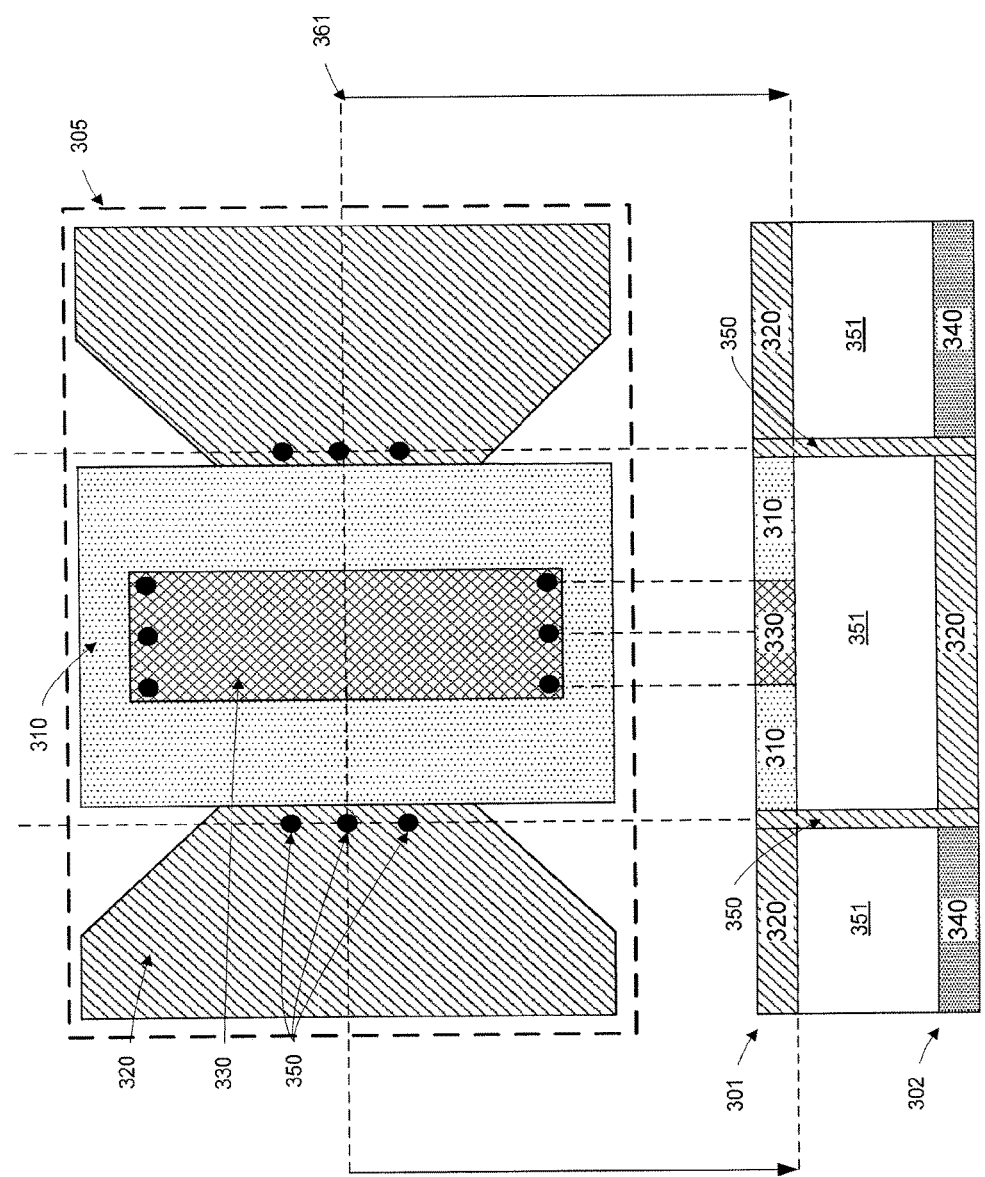
FIGS. 4A-4D illustrate blow-up and cross-sectional views of the crossover region of the capacitive node of FIGS. 3A-3B in accordance with certain embodiments of the present disclosure.
Figure 4B:
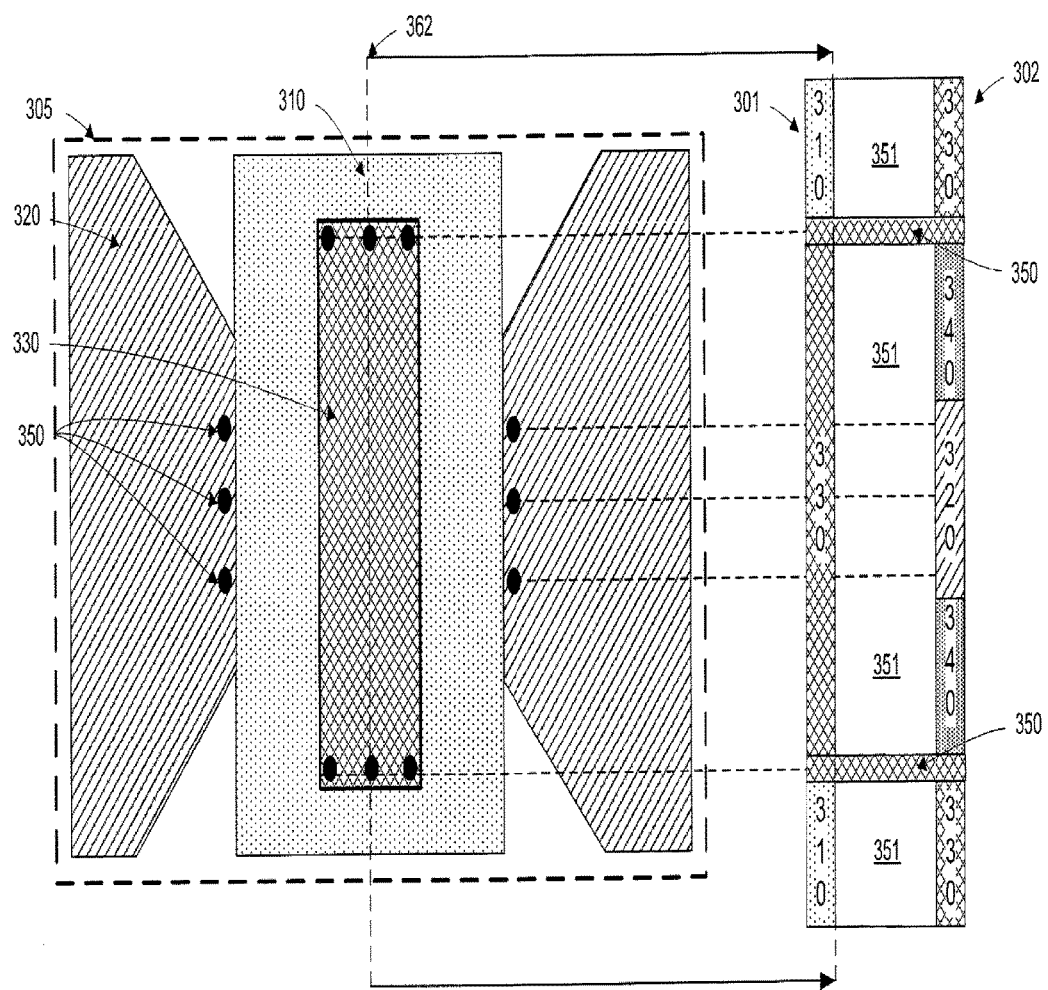
Figure 4C:
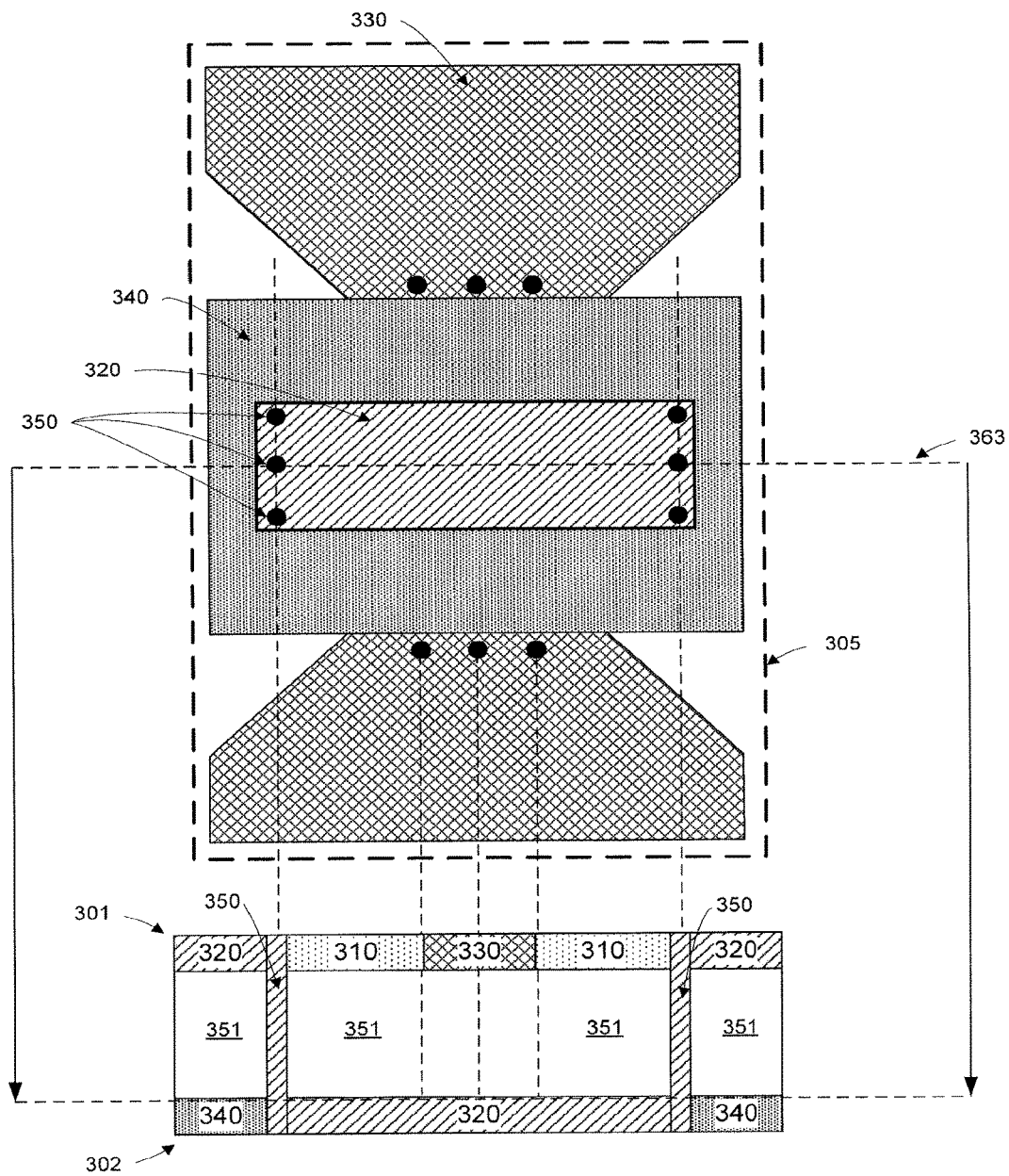
Figure 4D:
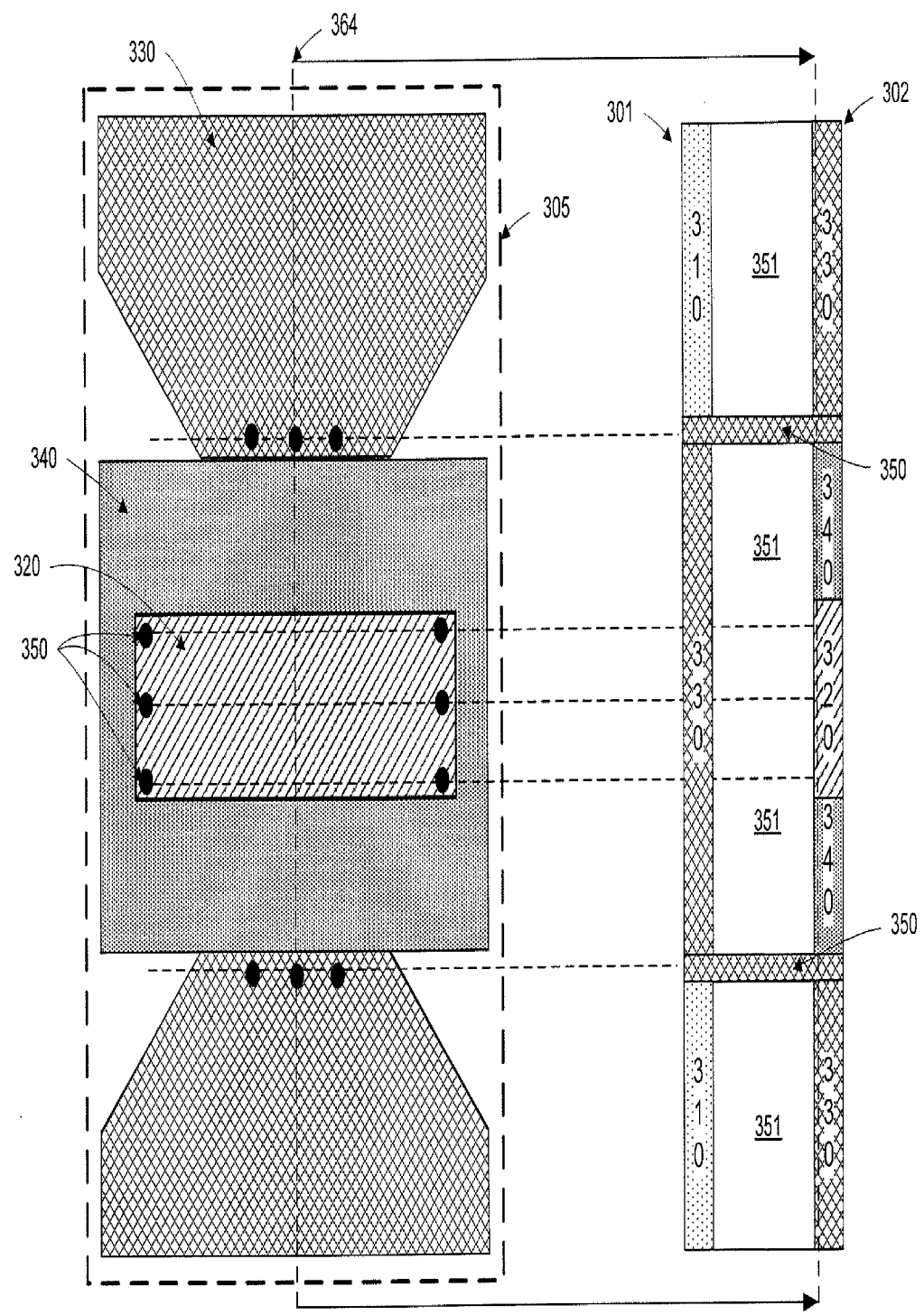

FIGS. 4A-4D illustrate blow-up and cross-sectional views of crossover region 305 of capacitive node 300 of FIGS. 3A-3B in accordance with certain embodiments of the present disclosure. More particularly, FIG. 4A illustrates a cross-section view of conductive mesh layer 301 at cutaway 361, FIG. 4B illustrates a cross-section view of conductive mesh layer 301 at cutaway 362, FIG. 4C illustrates a cross-section view of conductive mesh layer 302 at cutaway 363, and FIG. 4D illustrates a cross-section view of conductive mesh layer 302 at cutaway 364. As illustrated in FIGS. 4A-4B, crossover region 305 comprises a first portion 310, a second portion 320, and a third portion 330 of the conductive mesh 301. Each respective portion of the conductive mesh 301 in crossover region 305 is electrically uncoupled from the other respective portions of the conductive mesh 301 in the crossover region 305. Similarly, as illustrated in FIGS. 4C-4D, crossover region 305 comprises a first portion 330, a second portion 340, and a third portion 320 of the conductive mesh 302, wherein each respective portion of the second conductive mesh in the crossover region 305 is electrically uncoupled from the other respective portions of the second conductive mesh in the crossover region 305. The third portion 330 of the conductive mesh 301 is coupled to the first portion 330 of the conductive mesh 302, and the third portion 320 of the conductive mesh 302 is coupled to the second portion 320 of the conductive mesh 302. These couplings are made using one or more vias 350 disposed between conductive meshes 301 and 302. As shown, in some embodiments each coupling of mesh portions may require six electrical couplings.

The first portion 310 and the second portion 330 of conductive mesh 301 are substantially triangular (forming a diamond pattern in the array of layer 301), similar to first portion 330 and second portion 340 of conductive mesh 302. However, it will be understood any suitable shape may be used for the various portions of conductive meshes forming the electrodes of the respective layers in accordance with embodiments of the present disclosure, such as rectangular (or straight) shapes. Furthermore, the first conductive mesh and the second conductive mesh may be metal meshes, in some embodiments, and may be composed of a material such as copper, silver, carbon, a copper-based material, a silver-based material, or a carbon-based material.

Figure 5:
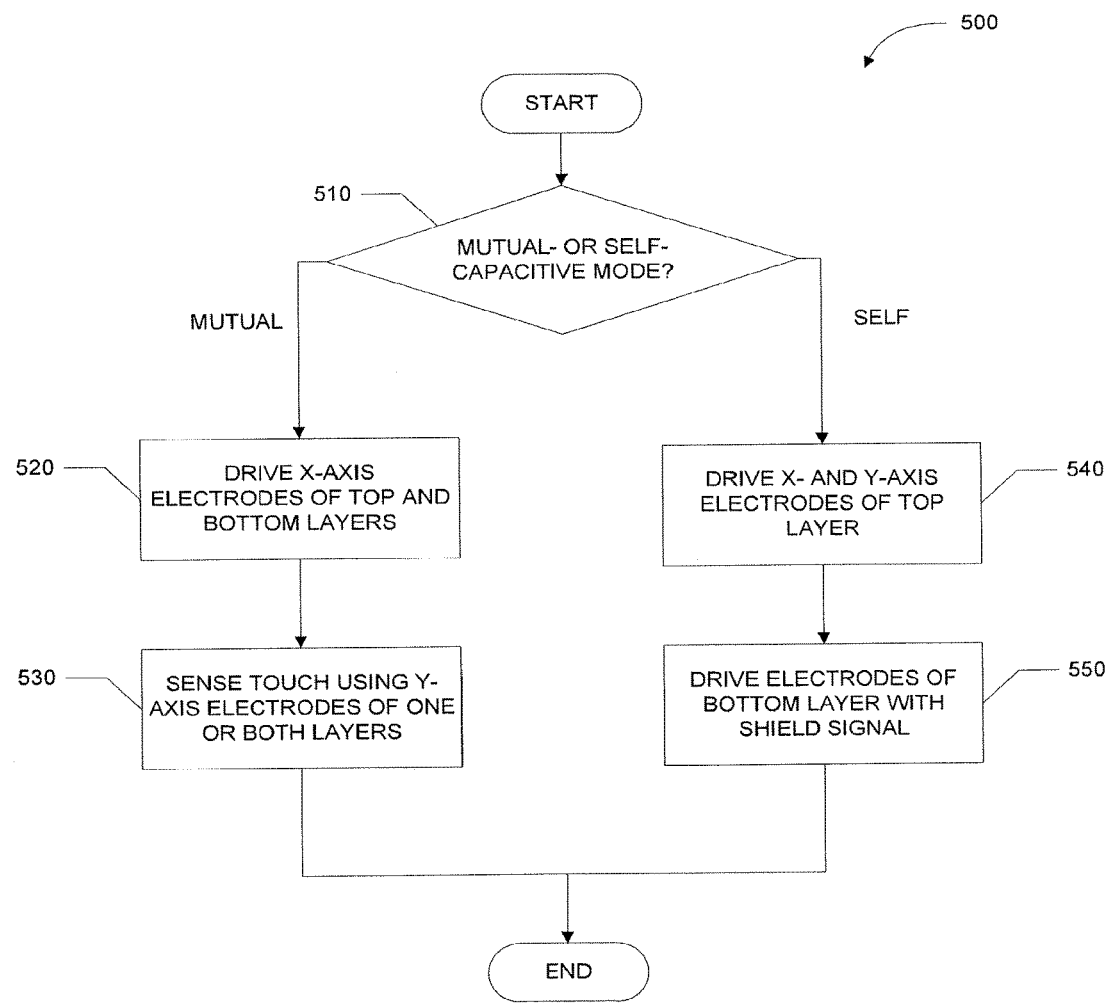
FIG. 5 illustrates an example method of controlling a two-layer touch sensor in accordance with embodiments of the present disclosure.

FIG. 5 illustrates an example method 500 of controlling a two-layer touch sensor in accordance with embodiments of the present disclosure. Method 500 may be performed by logic (e.g., hardware or software) of a touch sensor controller. For example, method 500 may be performed by executing (with one or more processors of the touch sensor controller) instructions stored in a computer-readable medium of the touch sensor controller. The method begins at step 510, where it is determined whether the touch sensor is to be operated in a mutual- or self-capacitive mode.

If the touch sensor is to be operated in a mutual-capacitive mode, then the method continues to steps 520 and 530, where the x-axis electrodes of the top and bottom layers of the touch sensor are driven and touch inputs are sensed using the y-axis electrodes of one or both layers, respectively. This may include, for example, sending a first drive signal to one or more x-axis electrodes of a first array of capacitive nodes, sending the first drive signal to one or more x-axis electrodes of a second array of capacitive nodes disposed below the first array of capacitive nodes, and sensing touch inputs based on signals received from y-axis electrodes of the first array. In some embodiments, sending the second drive signal to the first plurality of the electrodes of the first array comprises sending the second drive signal to a first portion of the electrodes of the first array and sending the shield signal to a second portion of the electrodes of the first array. The first drive signal may be a pulsed or alternating signal, in certain embodiments.

If the touch sensor is to be operated in a self-capacitive mode, then the method continues to steps 540 and 550, where one or more x-axis electrodes and one or more y-axis electrodes of the top layer are driven and the electrodes of the bottom layer are driven with a shield signal, respectively. This may include, for example, sending a second drive signal to a first plurality of the electrodes of the first array, sending a shield signal to each of the electrodes of the second array, and sensing touch inputs based on signals received from the first plurality of electrodes of the first array. The first drive signal and the second drive signal may be pulsed or alternating signals, in certain embodiments, and the shield signal is substantially similar to the second drive signal.

According to at least one embodiment of the present disclosure, a touch sensor includes a first array of capacitive nodes and a second array of capacitive nodes. The capacitive nodes of the first array are disposed above the capacitive nodes of the second array forming a plurality of crossover regions. Each crossover region includes a first portion, a second portion, and a third portion of the first array, wherein each respective portion of the first array in the crossover region is electrically uncoupled from the other respective portions of the first conductive mesh in the crossover region. Each crossover region further includes a first portion, a second portion, and a third portion of the second array, wherein each respective portion of the second array in the crossover region is electrically uncoupled from the other respective portions of the second conductive mesh in the crossover region. The third portion of the first array is coupled to the first portion of the second array, and the third portion of the second array is coupled to the second portion of the first array.

In one or more of the embodiments described above, the first array comprises a first conductive mesh, and the second array comprises a second conductive mesh.

In one or more of the embodiments described above, the third portion of the first conductive mesh is coupled to the first portion of the second conductive mesh using a first set of vias disposed between the first conductive mesh and the second conductive mesh, and the third portion of the second conductive mesh is coupled to the first portion of the first conductive mesh using a second set of vias disposed between the first conductive mesh and the second conductive mesh. In one or more of the embodiments described above, the first set of vias and the second set of vias are composed of the same material as the first conductive mesh and the second conductive mesh. In one or more of the embodiments described above, the first conductive mesh and the second conductive mesh are metal meshes.

In one or more of the embodiments described above, the first array comprises ITO electrodes, and the second array comprises ITO electrodes.

In one or more of the embodiments described above, each crossover region forms at least one capacitive node of the touch sensor.

In one or more of the embodiments described above, the first portion and the second portion of the first array are substantially triangular. In one or more of the embodiments described above, the first portion and the second portion of the first array are rectangular.

In one or more of the embodiments described above, a controller is coupled to the touch sensor. The controller comprises instructions embodied in a computer-readable medium, and the instructions are configured, when executed by a processor of the controller, to operate in either a mutual-capacitive mode or a self-capacitive mode of operation. When in the mutual-capacitive mode of operation, the instructions are operable, when executed, to send a first drive signal to x-axis electrodes of the first array, and send the first drive signal to x-axis electrodes of the second array. When in the self-capacitive mode of operation, the instructions are operable, when executed, to send a second drive signal to x-axis electrodes of the first array, send the second drive signal to y-axis electrodes of the first array, and send a shield signal to electrodes of the second array.

According to at least one embodiment of the present disclosure, a touch sensor includes a first conductive mesh and a second conductive mesh forming a plurality of crossover regions. Each crossover region forms a capacitive node of the touch sensor. Each crossover region includes a first portion, a second portion, and a third portion of the first conductive mesh, wherein each respective portion of the first conductive mesh in the crossover region is electrically uncoupled from the other respective portions of the first conductive mesh in the crossover region. Each crossover region further includes a first portion, a second portion, and a third portion of the second conductive mesh, wherein each respective portion of the second conductive mesh in the crossover region is electrically uncoupled from the other respective portions of the second conductive mesh in the crossover region. The third portion of the first conductive mesh is coupled to the first portion of the second conductive mesh using a first set of vias disposed between the first conductive mesh and the second conductive mesh. The third portion of the second conductive mesh is coupled to the second portion of the first conductive mesh using a second set of vias disposed between the first conductive mesh and the second conductive mesh. The first portion and the second portion of the first conductive mesh are substantially triangular, and the first portion and the second portion of the second conductive mesh are substantially triangular.

In one or more of the embodiments described above, the touch sensor is coupled to a display and a touch sensor controller. In one or more embodiments of the embodiments described above, the touch sensor is a portion of a touch-sensitive device.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these. A computer-readable non-transitory storage medium may be volatile, non-volatile, or a combination of volatile and non-volatile.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses a myriad of changes, substitutions, variations, alterations, and modifications to the example embodiments herein that a person having ordinary skill in the art would comprehend. Similarly, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A device, comprising:
  a touch sensor comprising:
    a first array of capacitive nodes;
    a second array of capacitive nodes;
    wherein the capacitive nodes of the first array are substantially aligned with the capacitive nodes of the second array in a mechanical stack; and
  a controller coupled to the touch sensor, the controller comprising logic configured, when executed, to cause the controller to, when in a self-capacitive mode of operation:
    send a first drive signal to a plurality of the electrodes of the first array;
    send a shield signal to at least a portion of the electrodes of the second array at the same time as the first drive signal is sent to the plurality of electrodes of the first array; and
    sense touch inputs based on signals received from the plurality of electrodes of the first array while the first drive signal is being sent to the plurality of electrodes of the first array and the shield signal is being sent to the at least a portion of the electrodes of the second array;
  wherein the alignment of the capacitive nodes of the first array and the capacitive nodes of the second array form a plurality of crossover regions, each crossover region comprising a first portion, a second portion, and a third portion of the first array, each respective portion of the first array in the crossover region electrically uncoupled from the other respective portions of the first array in the crossover region.

2. The device of claim 1 wherein the logic is further configured, when executed, to cause the controller to, when in a mutual-capacitive mode of operation:
  send a second drive signal to a first plurality of electrodes of the first array;
  send the second drive signal to a first plurality of electrodes of the second array at the same time as the second drive signal is sent to the first plurality of electrodes of the first array, the first plurality of electrodes of the second array corresponding with the first plurality of electrodes of the first array; and
  sense touch inputs based on signals received from a second plurality of electrodes of the first array while the first drive signal is being sent to the first plurality of electrodes of the first array and the first plurality of electrodes of the second array.

3. The device of claim 1, wherein the at least a portion of the electrodes of the second array corresponds with the first plurality of electrodes of the first array.

4. The device of claim 1, wherein the at least a portion of the electrodes of the second array comprises each electrode of the second array.

5. The device of claim 1, wherein the shield signal is substantially similar to the second drive signal.

6. The device of claim 1, wherein logic is further configured, when sending the first drive signal to the plurality of the electrodes of the first array, to:
  send the first drive signal to a first portion of the electrodes of the first array; and
  send the shield signal to a second portion of the electrodes of the first array.

7. The device of claim 1, wherein the electrodes of the first array and the electrodes of the second array are composed of a conductive mesh.

8. The device of claim 1, wherein the electrodes of the first array and the electrodes of the second array are composed of indium tin oxide (ITO).

9. The device of claim 1, each crossover region further comprising:
  a first portion, a second portion, and a third portion of the second array, wherein each respective portion of the second array in the crossover region is electrically uncoupled from the other respective portions of the second array in the crossover region;
  wherein the third portion of the first array is coupled to the first portion of the second array, and the third portion of the second array is coupled to the second portion of the first array.

10. A touch sensor controller comprising logic configured, when executed in a self-capacitive mode of operation, to:
  send a first drive signal to a plurality of the electrodes of a first array of capacitive nodes;
  send a shield signal to at least a portion of electrodes of a second array of capacitive nodes at the same time as the first drive signal is sent to the plurality of electrodes of the first array; and
  sense touch inputs based on signals received from the plurality of electrodes of the first array while the first drive signal is being sent to the plurality of electrodes of the first array and the shield signal is being sent to the at least a portion of the electrodes of the second array;

wherein the alignment of the capacitive nodes of the first array and the capacitive nodes of the second array form a plurality of crossover regions, each crossover region comprising a first portion, a second portion, and a third portion of the first array, each respective portion of the first array in the crossover region electrically uncoupled from the other respective portions of the first array in the crossover region.

11. The touch sensor controller of claim 10, wherein the logic is further configured, when executed in a mutual-capacitive mode of operation, to:

send a second drive signal to a first plurality of electrodes of the first array;

send the second drive signal to a first plurality of electrodes of the second array at the same time as the second drive signal is sent to the first plurality of electrodes of the first array, the first plurality of electrodes of the second array corresponding with the first plurality of electrodes of the first array; and sense touch inputs based on signals received from a second plurality of electrodes of the first array while the first drive signal is being sent to the first plurality of electrodes of the first array and the first plurality of electrodes of the second array.

12. The touch sensor controller of claim 10, wherein the at least a portion of the electrodes of the second array corresponds with the first plurality of electrodes of the first array.

13. The touch sensor controller of claim 10, wherein the at least a portion of the electrodes of the second array comprises each electrode of the second array.

14. The touch sensor controller of claim 10, wherein the shield signal is substantially similar to the second drive signal.

15. The touch sensor controller of claim 10, wherein the logic is further configured, when sending the first drive signal to the plurality of the electrodes of the first array, to:

send the first drive signal to a first portion of the electrodes of the first array; and send the shield signal to a second portion of the electrodes of the first array.

16. A method, comprising:

sending, in a self-capacitive mode of operation, a first drive signal to a plurality of the electrodes of a first array of capacitive nodes, the capacitive nodes of the first array being substantially aligned with capacitive nodes of a second array of capacitive nodes in a mechanical stack;

sending, in the self-capacitive mode of operation, a shield signal to at least a portion of electrodes of the second array of capacitive nodes at the same time as the first drive signal is sent to the plurality of electrodes of the first array; and sensing, in the self-capacitive mode of operation, touch inputs based on signals received from the plurality of electrodes of the first array while the first drive signal is being sent to the plurality of electrodes of the first array and the shield signal is being sent to the at least a portion of the electrodes of the second array;

wherein the alignment of the capacitive nodes of the first array and the capacitive nodes of the second array form a plurality of crossover regions, each crossover region comprising a first portion, a second portion, and a third portion of the first array, each respective portion of the first array in the crossover region electrically uncoupled from the other respective portions of the first array in the crossover region.

17. The method of claim 16, further comprising:

sending, in a mutual-capacitive mode of operation, a second drive signal to a first plurality of electrodes of the first array;

sending, in the mutual-capacitive mode of operation, the second drive signal to a first plurality of electrodes of the second array at the same time as the second drive signal is sent to the first plurality of electrodes of the first array, the first plurality of electrodes of the second array corresponding with the first plurality of electrodes of the first array; and sensing, in the mutual-capacitive mode of operation, touch inputs based on signals received from a second plurality of electrodes of the first array while the first drive signal is being sent to the first plurality of electrodes of the first array and the first plurality of electrodes of the second array.

18. The method of claim 16, wherein the at least a portion of the electrodes of the second array corresponds with the first plurality of electrodes of the first array.

19. The method of claim 16, wherein the at least a portion of the electrodes of the second array comprises each electrode of the second array.

20. The method of claim 16, wherein the shield signal is substantially similar to the second drive signal.

* * * * *